United States Patent
Wei et al.

(10) Patent No.: US 12,240,732 B2
(45) Date of Patent: Mar. 4, 2025

(54) NOTIFICATION SYSTEM AND METHOD FOR AN ELEVATOR AND AN ELEVATOR SYSTEM

(71) Applicant: Otis Elevator Company, Farmington, CT (US)

(72) Inventors: Lieping Wei, Shanghai (CN); Wenbo Huang, Shanghai (CN); Heping Qiu, Shanghai (CN); Jingyu Tong, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1570 days.

(21) Appl. No.: 16/571,777

(22) Filed: Sep. 16, 2019

(65) Prior Publication Data

US 2020/0087107 A1    Mar. 19, 2020

(30) Foreign Application Priority Data

Sep. 18, 2018    (CN) .......................... 201811086438.0

(51) Int. Cl.
*B66B 1/46*    (2006.01)
*B66B 1/06*    (2006.01)
(Continued)

(52) U.S. Cl.
CPC ................ *B66B 1/466* (2013.01); *B66B 1/06* (2013.01); *B66B 1/3461* (2013.01); *B66B 3/002* (2013.01); *H04W 4/33* (2018.02)

(58) Field of Classification Search
CPC ......... B66B 1/466; B66B 1/06; B66B 1/3461; B66B 3/002; B66B 5/0025; B66B 1/3415; H04W 4/33; H04W 4/021
See application file for complete search history.

(56) References Cited

U.S. PATENT DOCUMENTS

| 8,151,942 B2 | 4/2012 | Rusanen et al. |
| 9,747,585 B2 | 8/2017 | Eleid et al. |

(Continued)

FOREIGN PATENT DOCUMENTS

| CN | 1990370 A | 7/2007 |
| CN | 204408574 U | 6/2015 |

(Continued)

OTHER PUBLICATIONS

European Search Report for application EP 19198142, dated Feb. 20, 2020, 55 pages.

(Continued)

*Primary Examiner* — Jeffrey Donels
(74) *Attorney, Agent, or Firm* — CANTOR COLBURN LLP

(57) ABSTRACT

A notification system and a notification method for an elevator, and an elevator system are provided by the present disclosure. The notification system for an elevator includes: a wake-up module, which is configured to wake up a user mobile terminal when the user mobile terminal enters a specified area, so that the user mobile terminal sends a request to a server; and the server, which is configured to receive a reminder item setting from an administrator, and which is configured to push a reminder item to the user mobile terminal upon receiving the request from the user mobile terminal, the reminder item including elevator repair or maintenance information. The system and method according to the present disclosure allows a user to conveniently know about elevator repair or maintenance information.

18 Claims, 1 Drawing Sheet

(51) Int. Cl.
    *B66B 1/34*      (2006.01)
    *B66B 3/00*      (2006.01)
    *H04W 4/33*      (2018.01)

(56) References Cited

U.S. PATENT DOCUMENTS

| | | | |
|---|---|---|---|
| 9,878,876 B2 | 1/2018 | Wilke et al. | |
| 9,969,597 B2 | 5/2018 | Beloin et al. | |
| 10,029,884 B2 | 7/2018 | Youker et al. | |
| 2015/0339871 A1 | 11/2015 | Wagner et al. | |
| 2017/0057781 A1 | 3/2017 | Depaola | |
| 2018/0201473 A1 | 7/2018 | Noxon et al. | |
| 2018/0370758 A1* | 12/2018 | Huang | B66B 1/50 |
| 2019/0185292 A1* | 6/2019 | Yang | B66B 5/0025 |
| 2019/0193989 A1* | 6/2019 | Huang | B66B 1/468 |
| 2019/0263627 A1* | 8/2019 | Huang | H04W 4/80 |
| 2020/0035200 A1* | 1/2020 | Qiu | B66B 1/468 |

FOREIGN PATENT DOCUMENTS

| | | | |
|---|---|---|---|
| CN | 105621180 A | 6/2016 | |
| CN | 105960372 A | 9/2016 | |
| CN | 105173930 B | 4/2017 | |
| CN | 106744111 A | 5/2017 | |
| CN | 107140495 A | 9/2017 | |
| CN | 107337039 A | 11/2017 | |
| CN | 107635902 A | 1/2018 | |
| JP | 2003020174 A | 1/2003 | |
| JP | 2010095359 A | 4/2010 | |
| WO | WO-2012062957 A1 * | 5/2012 | ........... B66B 5/0006 |
| WO | 2017103320 A1 | 6/2017 | |

OTHER PUBLICATIONS

Zafari, Faheem et al., "An iBeacon based Proximity and Indoor Localization System", available at: https://arxiv.org/pdf/1703.07876.pdf, Mar. 24, 2017, 14 pages.

European Examination Report for Application No. 19198142.2; Issued Dec. 17, 2021; 6 Pages.

* cited by examiner

NOTIFICATION SYSTEM AND METHOD FOR AN ELEVATOR AND AN ELEVATOR SYSTEM

FOREIGN PRIORITY

This application claims priority to Chinese Patent Application No. 201811086438.0, filed Sep. 18, 2018, and all the benefits accruing therefrom under 35 U.S.C. § 119, the contents of which in its entirety are herein incorporated by reference.

FIELD OF THE INVENTION

The present disclosure relates to the technical field of elevators, and in particular to a notification system and a notification method for an elevator, especially for elevator repair or maintenance information.

BACKGROUND OF THE INVENTION

An elevator system requires regular maintenance during use, and emergency maintenance is also required in the event of elevator system failure. The elevator will be deactivated when it is being serviced or repaired. In existing elevator systems, during routine repair or maintenance of the elevator, the constructor will, for example, set up a fence or a warning sign in front of the elevator in the elevator lobby at the first floor to remind passengers to avoid entering the elevator that is being serviced or repaired. It is impossible for passengers to know specific information of the construction, such as the completion time of construction, etc.

SUMMARY OF THE INVENTION

It is an object of the present disclosure to solve or at least alleviate the problems in the prior art.

In accordance with some features, an object of the present disclosure is to enable a user to easily know about elevator repair or maintenance information.

In an aspect, a notification system for an elevator is provided, which includes: a wake-up module, which is configured to wake up a user mobile terminal when the user mobile terminal enters a specified area, so that the user mobile terminal sends a request to a server; and the server, which is configured to receive a reminder item setting from an administrator, and which is configured to push a reminder item to the user mobile terminal upon receiving the request from the user mobile terminal, the reminder item including elevator repair or maintenance information.

Optionally, in the notification system, the wake-up module is a Bluetooth module.

Optionally, in the notification system, the wake-up module is arranged in a building in which an elevator associated with the elevator repair or maintenance information is located.

Optionally, in the notification system, the wake-up module is arranged in an elevator lobby or in an elevator car.

Optionally, in the notification system, the specified area covers an elevator lobby at a first floor of the building.

Optionally, in the notification system, the reminder item further includes other items related to the building in which the wake-up module is located.

Optionally, in the notification system, the elevator repair or maintenance information includes one or more of an elevator identity number, an elevator maintenance start time, an elevator maintenance end time, elevator maintenance items, and an elevator maintenance personnel contact.

Optionally, in the notification system, the server is further configured to receive a reminder item cancellation setting from the administrator.

Optionally, in the notification system, the server is a local server or a cloud server.

Optionally, in the notification system, the server communicates with the user mobile terminal via a mobile data network.

In another aspect, an elevator system is provided, which includes: one or more elevators in a building; and a notification system according to various embodiments of the present disclosure, which is associated with the one or more elevators.

In another aspect, a notification method for an elevator is provided, the method including: receiving, by a server, a reminder item setting from an administrator; waking up a user mobile terminal by a wake-up module when the user mobile terminal enters a specified area, so that the user mobile terminal sends a request to the server; and pushing the reminder item to the user mobile terminal by the server when the server receives the request from the user mobile terminal, the reminder item including elevator repair or maintenance information.

Optionally, the notification method further includes using a Bluetooth module as the wake-up module.

Optionally, the notification method further includes arranging the wake-up module in a building in which an elevator associated with the elevator repair or maintenance information is located.

Optionally, the notification method further includes arranging the wake-up module in an elevator lobby or in an elevator car.

Optionally, the notification method further includes arranging the wake-up module such that the specified area covers an elevator lobby at a first floor of the building.

Optionally, in the notification method, the reminder item further includes other items related to the building in which the wake-up module is located.

Optionally, in the notification method, the elevator repair or maintenance information includes one or more of an elevator identity number, an elevator maintenance start time, an elevator maintenance end time, elevator maintenance items, and an elevator maintenance personnel contact.

Optionally, in the notification method, the server is further configured to receive a reminder item cancellation setting from the administrator.

Optionally, the notification method further includes setting the server locally or in the cloud.

The system and method according to the present disclosure allows a user to easily know about elevator repair or maintenance information.

BRIEF DESCRIPTION OF THE DRAWINGS

The contents of the present disclosure will become more easily understood with reference to the accompanying drawings. Those skilled in the art can readily appreciate that the drawings are for illustrative purposes only, instead of being intended to limit the scope of protection of the present disclosure. In addition, similar numbers in the drawings are used to indicate similar parts, wherein.

DETAILED DESCRIPTION OF THE EMBODIMENT(S) OF THE INVENTION

It will be readily understood that, based on the technical solutions of the present disclosure, those skilled in the art can propose various alternative embodiments and implementations without departing from the true spirit of the present disclosure. Therefore, the following detailed description and the accompanying drawings are merely exemplary description of the technical solutions of the present disclosure, which shall not be deemed as the whole of the present disclosure or as limiting or restricting the technical solutions of the present disclosure.

Such orientation terms as upper, lower, left, right, front, rear, front side, back side, top, bottom or the like that are mentioned or may be mentioned in this description are defined with respect to the configurations shown in the individual drawings. They are relative concepts and thus possibly vary according to their different locations and different usage states. Therefore, these or other orientation terms shall not be interpreted as limiting terms.

Figure 1:
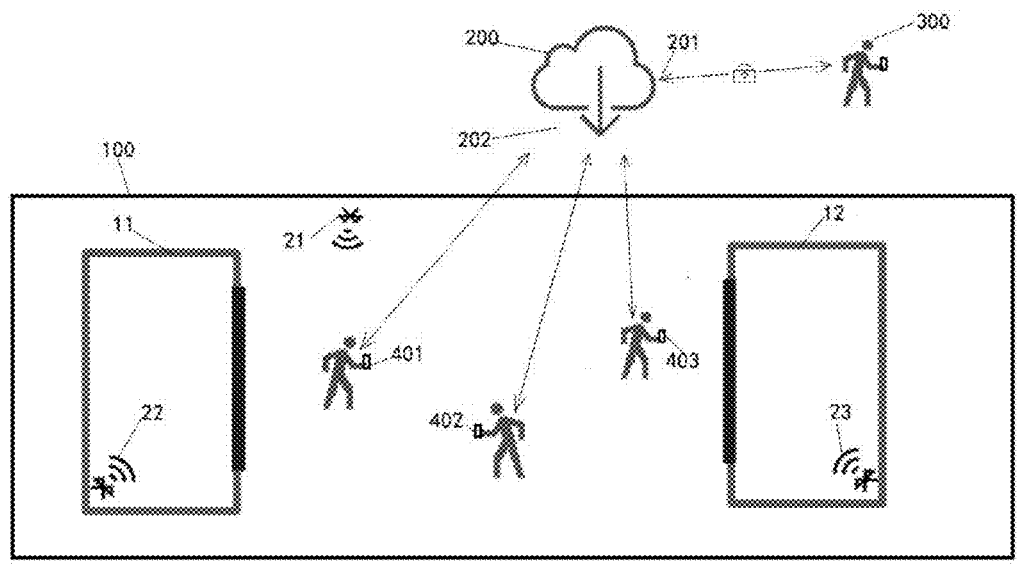
FIG. 1 is a schematic diagram showing an application scenario of a notification system according to an embodiment of the present disclosure.

Referring to FIG. 1, the present disclosure provides a notification system for an elevator, which includes a wake-up module and a server. In the embodiment shown in FIG. 1, the notification system includes a first wake-up module 21 disposed in a floor lobby of a building 100, a second wake-up module 22 disposed in a car of a first elevator 11 in the building 100, and a third wake-up module 23 disposed in a car of a second elevator 12 in the building 100. Each of the wake-up modules has certain coverage. For example, the first wake-up module 21 covers a first-floor lobby of the building 100, the second wake-up module 22 covers an interior space of the car of the first elevator 11, and the third wake-up module 23 covers an interior space of the car of the second elevator 12. Each wake-up module wakes up a user mobile terminal such as a mobile phone carried by a passenger when the user mobile terminal enters the coverage of the wake-up module, such that the user mobile terminal sends a request to a server; more specifically, the wake-up module can send a request to the server by waking up a pre-installed application (APP) in the user mobile terminal of the passenger. In another aspect, the notification system further includes a server 200 configured to receive, on one hand, a reminder item setting from an administrator via a first port 201, and further configured to receive requests from user mobile terminals 401, 402 and 403 via a second port 202 and push the reminder item to the user mobile terminals 401, 402 and 403. The reminder item includes elevator repair or maintenance information. In an embodiment of the present disclosure, the administrator may be a user with special authorities; for example, the administrator's authorities may be opened to maintenance personnel, construction personnel or property management personnel. In an embodiment of the present disclosure, the user mobile terminal 401, 402 and 403 may be a mobile phone or the like which has a specific application (APP) installed, which for example may be promoted to a popularity who frequently enters and exits the building. With the notification system according to the embodiment of the present disclosure, the maintenance personnel or the property management personnel can set the elevator maintenance information in the server 200 in advance, and the user will request and receive the elevator maintenance information from the server 200 after entering a specified range covered by the wake-up module such that the user can properly schedule a travel, such as avoiding the elevator maintenance time. For example, when the building is an office building, the person working in the office building can download the application. When the person enters the specified range, the wake-up module causes the user mobile terminal to send a request to the server, and the server pushes the elevator maintenance information in the building to the person. The person can know that the elevator is or will be undergoing repair or maintenance. Similarly, the system can also be installed in residential buildings.

In some embodiments, the wake-up modules are arranged in the building 100 in which the elevators 11, 12 associated with the elevator repair or maintenance information are located. In some embodiments, the wake-up modules can also be disposed outside the building 100. In some embodiments, the number and arrangement of the wake-up modules may be modified, such as arranging the wake-up modules only in the elevator lobby, or arranging the wake-up modules only in the elevator car. In some embodiments, the wake-up modules can be arranged such that the specified area covers the elevator lobby at the first floor, and in some embodiments, the wake-up modules can be arranged such that the specified area covers the elevator lobby at a selected floor, or all the elevator lobbies and elevator cars. In some embodiments, the wake-up module can be a Bluetooth module that is less expensive and can effectively cover a specified range. In an alternative embodiment, the wake-up module may also be a module having a function of waking-up the user mobile terminal based on other wireless transmission modes.

In some embodiments, a repair or maintenance service provider or a building administrator, such as property management personnel, may make the reminder item setting. In some embodiments, the elevator maintenance information in the reminder item may include one or more of an elevator identity number, an elevator maintenance start time, an elevator maintenance end time, elevator maintenance items, and an elevator maintenance personnel contact. For example, after receiving the request, the server 200 will send information to the user mobile terminal, including: No. 1 elevator 11 will be maintained on Sep. 15 and Sep. 16, 2018, from 10:00 to 12:00 in the morning, person in charge: XXX, contact number: XXX, etc. In some embodiments, the server 200 is further configured to receive a reminder item cancellation setting from the administrator. After receiving the reminder item cancellation setting, the server 200 cancels the corresponding reminder items. In some embodiments, the same system can also be promoted for other reminder items. For example, in some embodiments, the reminder items also include other items related to the building 100 in which the wake-up modules are located, such as power outages, gas supply cut-off, water supply cut-off, fire drill, and the like. In some embodiments, the server 200 is a local server or a cloud server, and communication between the server and the user mobile terminal can be realized by any suitable mobile data network, such as 2G, 3G and 4G networks, and the like. In some embodiments, if a plurality of wake-up modules are disposed in the building, they can be coordinated by the server to prevent the same reminder item from being sent to the same user mobile terminal for multiple times.

In another aspect, an elevator system is also provided, which includes: one or more elevators 11, 12 in a building 100; and a notification system according to various embodiments of the present disclosure, which is associated with the one or more elevators.

Figure 2:
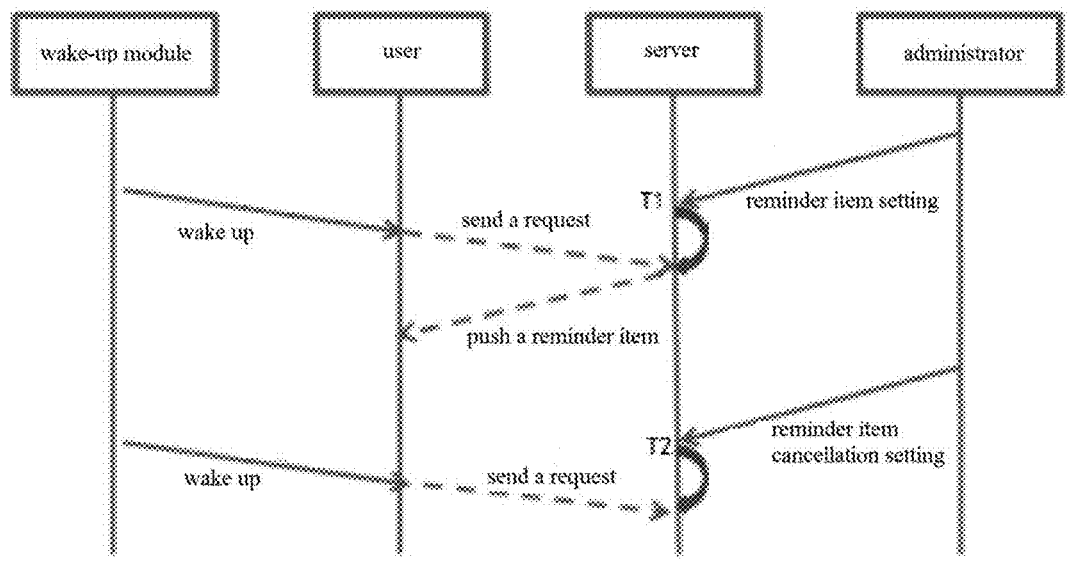
FIG. 2 illustrates a notification method according to an embodiment of the present disclosure.

With continued reference to FIG. 2, a schematic diagram of a notification method according to the present disclosure is shown. The notification method for an elevator according to an embodiment of the present disclosure includes: receiving, by a server, a reminder item setting; waking up a user mobile terminal by a wake-up module when the user mobile terminal enters a specified area, so that the user mobile terminal sends a request to the server; and pushing the reminder item to the user mobile terminal by the server when the server receives the request from the user mobile terminal, the reminder item including elevator repair or maintenance information. For example, the maintenance personnel may send a reminder item setting including elevator maintenance information to the server at time T1. The wake-up module wakes up the user mobile terminal upon detecting that the user mobile terminal enters the specified area, such that the user mobile terminal sends a request to the server. After receiving the request from the user mobile terminal after the T1 time, the server pushes the reminder item including the elevator maintenance information to the user mobile terminal, thereby notifying the user of the information on elevator maintenance, and the user can schedule the travel plan based on the information. In some embodiments, the server further receives a reminder item cancellation setting. For example, the maintenance personnel may send a reminder item cancellation setting to the server at a T2 time after the maintenance is completed, and after the T2, even if the server receives a request from the user mobile terminal, no information will be pushed to the user mobile terminal.

In some embodiments, the method further includes using a Bluetooth module as the wake-up module. In some embodiments, the method further includes arranging the wake-up module in a building in which the elevator associated with the elevator repair or maintenance information is located. In some embodiments, the method further includes arranging the wake-up module in an elevator lobby or in an elevator car. In some embodiments, the method further includes arranging the wake-up module such that the specified area covers an elevator lobby at a first floor. In some embodiments, the elevator repair or maintenance information includes one or more of an elevator maintenance start time, an elevator maintenance end time, elevator maintenance items, and an elevator maintenance personnel contact. In some embodiments, the reminder item further includes other items related to the building in which the wake-up module is located, such as water supply cut-off, power outages, gas supply cut-off, and the like related to the building or a community in which the building is located. In some embodiments, the method further includes setting the server locally or in the cloud.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. It should be understood that these modifications or changes should be included within the scope of protection of the present disclosure.

What is claimed is:

1. A notification system for an elevator, comprising:
   a wake-up module, which is configured to wake up a user mobile terminal when the user mobile terminal enters a specified area, so that the user mobile terminal sends a request to a server; and
   the server configured to receive a reminder item setting from an administrator, and the server configured to push a reminder item to the user mobile terminal upon receiving the request from the user mobile terminal, the reminder item comprising elevator repair or maintenance information;
   wherein the server is further configured to receive a reminder item cancellation setting from the administrator, the server configured to cease pushing reminder items to the mobile device in response to the item cancellation setting.

2. The notification system according to claim 1, wherein the wake-up module is a Bluetooth module.

3. The notification system according to claim 1, wherein the wake-up module is arranged in a building in which an elevator associated with the elevator repair or maintenance information is located.

4. The notification system according to claim 3, wherein the wake-up module is arranged in an elevator lobby or in an elevator car.

5. The notification system according to claim 3, wherein the specified area covers an elevator lobby at a first floor of the building.

6. The notification system according to claim 3, wherein the reminder item further comprises other items related to the building in which the wake-up module is located.

7. The notification system according to claim 1, wherein the elevator repair or maintenance information comprises one or more of an elevator identity number, an elevator maintenance start time, an elevator maintenance end time, elevator maintenance items, and an elevator maintenance personnel contact.

8. The notification system according to claim 1, wherein the server is a local server or a cloud server.

9. The notification system according to claim 1, wherein the server communicates with the user mobile terminal via a mobile data network.

10. An elevator system, comprising:
    one or more elevators in a building; and
    a notification system according to claim 1, which is associated with the one or more elevators.

11. A notification method for an elevator, comprising:
    receiving, by a server, a reminder item setting from an administrator;
    waking up a user mobile terminal by a wake-up module when the user mobile terminal enters a specified area, so that the user mobile terminal sends a request to the server; and
    pushing the reminder item to the user mobile terminal by the server when the server receives the request from the user mobile terminal, the reminder item comprising elevator repair or maintenance information;
    receiving a reminder item cancellation setting from the administrator;
    ceasing pushing reminder items to the mobile device in response to the item cancellation setting.

12. The notification method according to claim 11, further comprising using a Bluetooth module as the wake-up module.

13. The notification method according to claim 11, further comprising arranging the wake-up module in a building in which an elevator associated with the elevator repair or maintenance information is located.

14. The notification method according to claim 13, further comprising arranging the wake-up module in an elevator lobby or in an elevator car.

15. The notification method according to claim 13, further comprising arranging the wake-up module such that the specified area covers an elevator lobby at a first floor of the building.

16. The notification method according to claim 13, wherein the reminder item further comprises other items related to the building in which the wake-up module is located.

17. The notification method according to claim 11, wherein the elevator repair or maintenance information comprises one or more of an elevator identity number, an elevator maintenance start time, an elevator maintenance end time, elevator maintenance items, and an elevator maintenance personnel contact.

18. The notification method according to claim 11, further comprising setting the server locally or in the cloud.

\* \* \* \* \*